United States Patent [19]

Yoshiya

[11] 4,351,062

[45] Sep. 21, 1982

[54] METHOD AND APPARATUS FOR SUPPRESSING DIGITAL ERROR NOISE IN DIGITAL COMMUNICATION

[75] Inventor: Kiyosumi Yoshiya, Kodaira, Japan

[73] Assignee: Radio Research Laboratories, Ministry of Posts and Telecommunications, Tokyo, Japan

[21] Appl. No.: 195,336

[22] Filed: Oct. 8, 1980

[30] Foreign Application Priority Data

Jan. 29, 1980 [JP] Japan ............................. 50-008285

[51] Int. Cl.³ ............................................. H03K 5/01
[52] U.S. Cl. ................................... 375/99; 364/576; 179/1 P
[58] Field of Search ................ 179/1 P; 307/540, 542; 364/576, 726, 574; 375/99, 102, 104; 455/223, 224, 303, 304, 305

[56] References Cited

U.S. PATENT DOCUMENTS

| | | | |
|---|---|---|---|
| 3,699,457 | 10/1972 | Wright | 455/224 |
| 3,953,802 | 4/1976 | Morris et al. | 375/104 |
| 4,005,417 | 1/1977 | Collins | 364/576 |
| 4,058,713 | 11/1977 | DiTorro | 364/726 |

*Primary Examiner*—Benedict V. Safourek
*Attorney, Agent, or Firm*—Kurt Kelman

[57] ABSTRACT

In digital telecommunication, the suppression of digital error noise contained in the signals received by the receiver is accomplished by subjecting the received signals to Fourier transform thereby to obtain a frequency spectrum, subtracting a predetermined flat spectrum from the amplitude spectrum of the frequency spectrum, subjecting the resulting difference to invert Fourier transform thereby to extract any digital error noise component and correcting the particular sampled signal containing the noise component by use of interpolation with respect to the preceding and following sets each of several sampled signals between which the particular sampled signal is interposed, whereby sampled signals free from the digital error noise are delivered as output signals.

8 Claims, 5 Drawing Figures

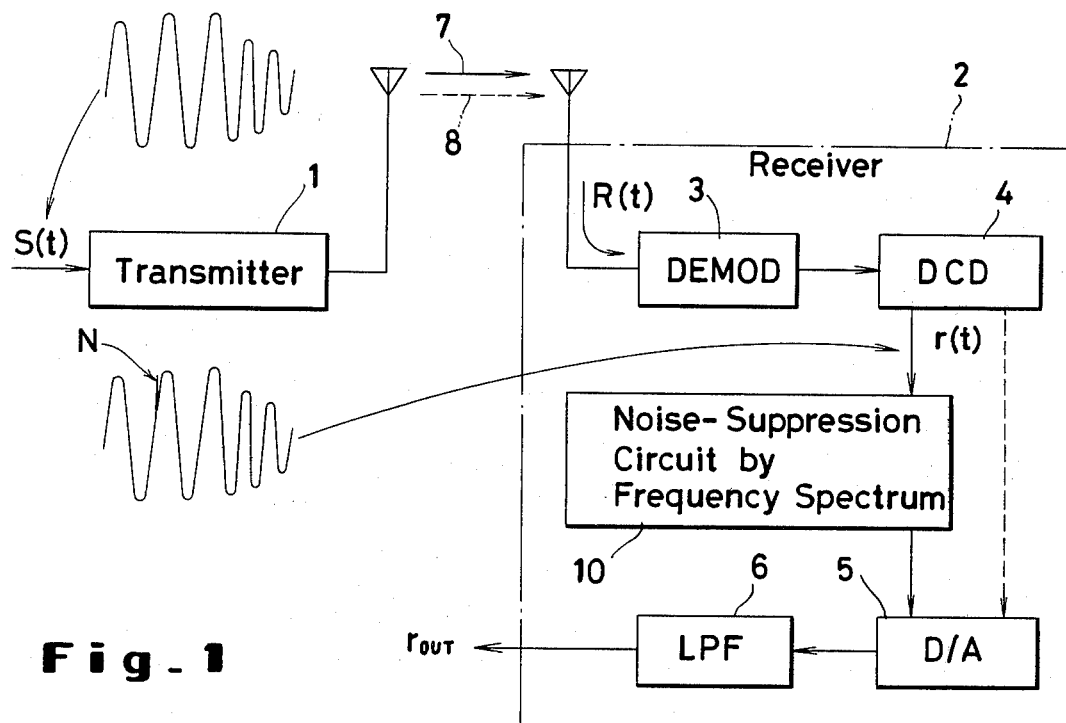
Fig_1
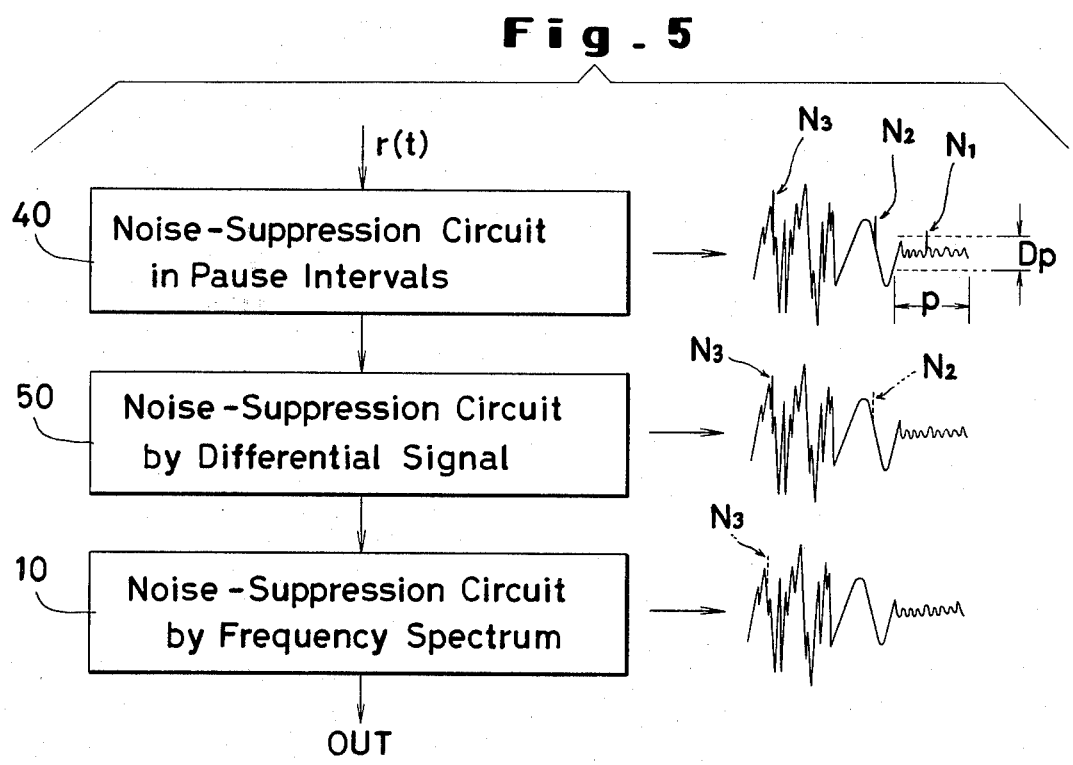
Fig_5

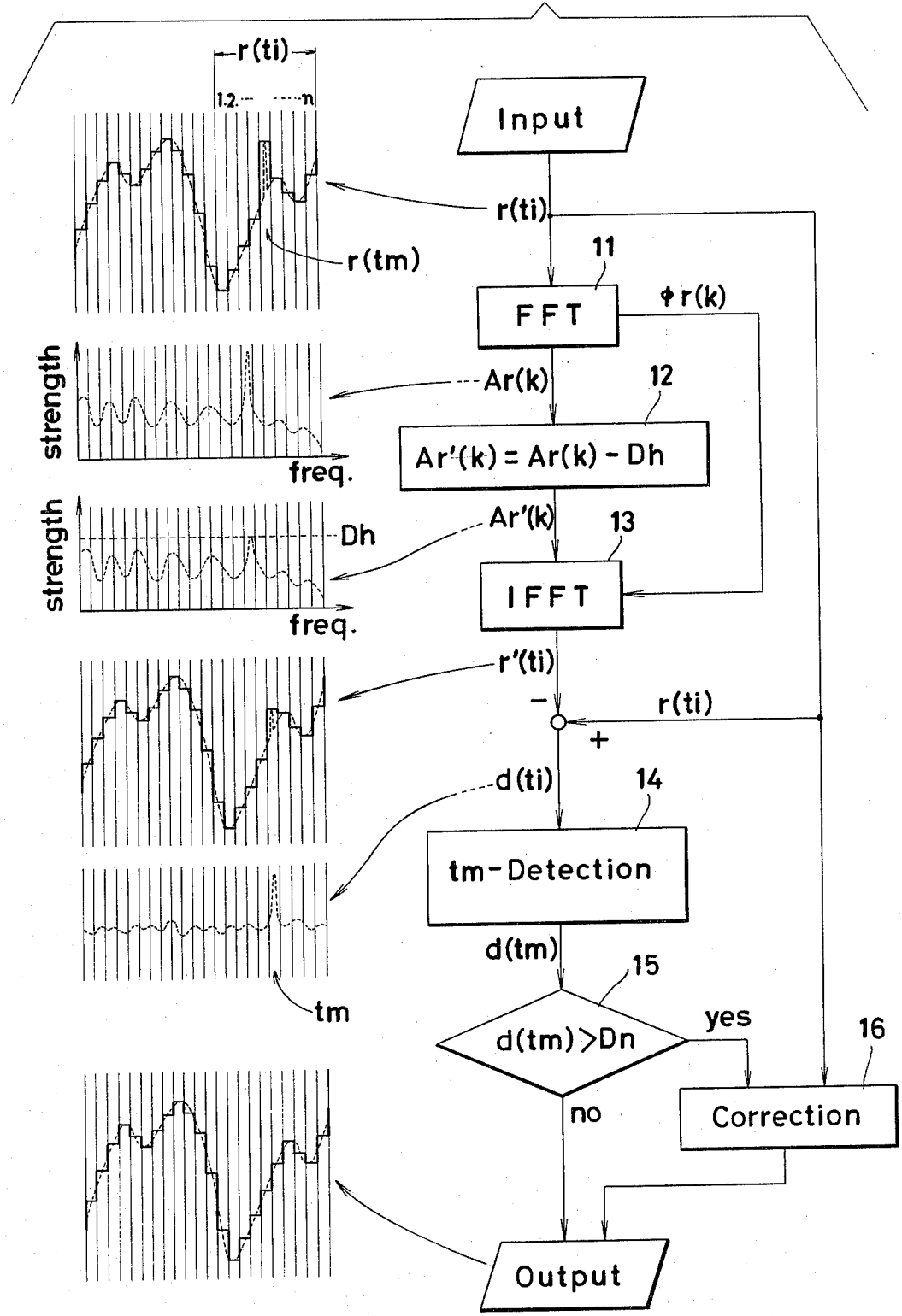

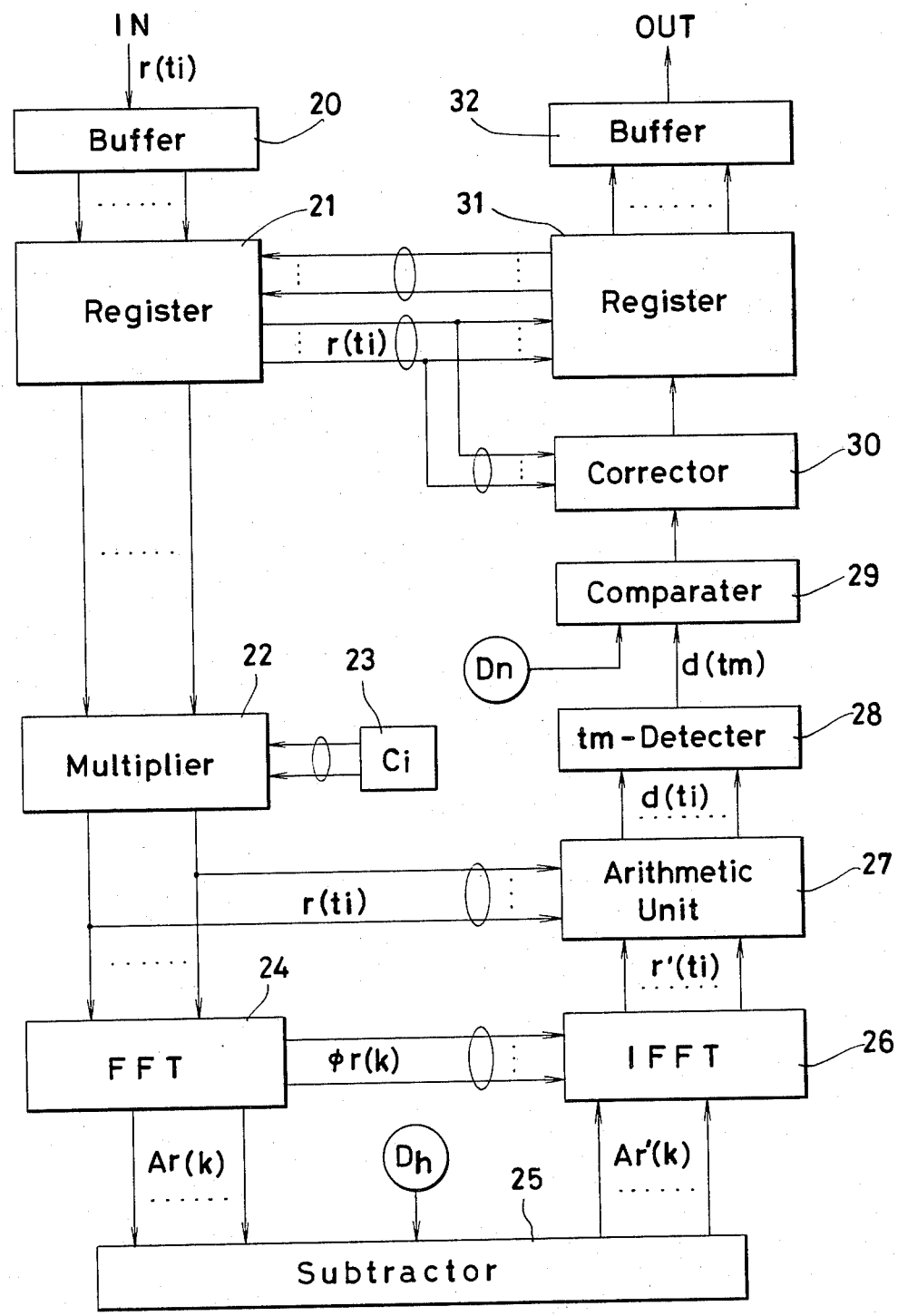
Fig_3

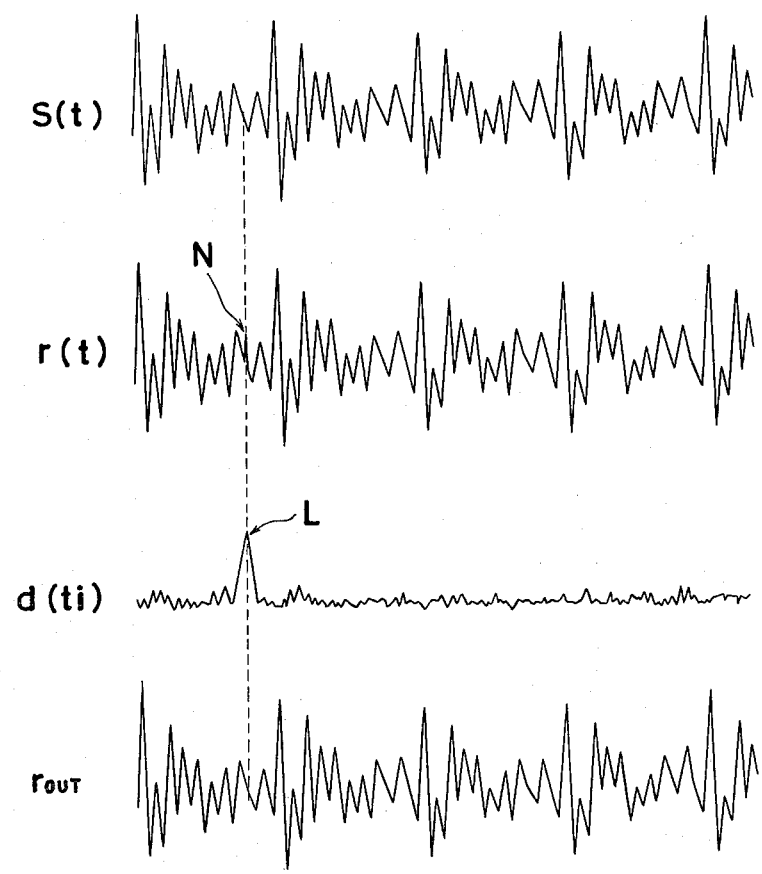

METHOD AND APPARATUS FOR SUPPRESSING DIGITAL ERROR NOISE IN DIGITAL COMMUNICATION

BACKGROUND OF THE INVENTION

This invention relates to a method and apparatus for suppressing digital error noise contained in the received data signals in digital telecommunication. Pulse code modulation (PCM) communication, a means of communication relatively free from the effect of noise, has found the widest acceptance among the various modes of digital telecommunication. It not merely provides high-quality communication but also makes possible communication having a large channel capacity by means of high-density and multiplex transmission. It has already been extensively adopted in communications satellites and telephone systems. PCM communication is accomplished on the transmitter side by sampling the information signals at high speed to generate sampled values, encoding these sampled values in amplitude into serial binary signals and transmitting the binary signals using a carrier wave, and on the receiver side by receiving and decoding the binary signals to reproduce the information. The binary signals in this system of a fixed amplitude are serially arranged in correspondance with the amplitude of the sampled values, i.e., the arrangement of the binary signals represent the amplitude of the respective sampled values and are required for reproducing the transmitted information. This means that the transmitted information is unrelated to the amplitudes of the sampled values and that noise below a predetermined amplitude level of the binary signal has no effect whatever upon the information in transmission.

When the information transmitted via the propagation path is exposed to a noise of a level high enough to deform the binary signal owing to atmospherics, electric disturbance, rain-fall attenuation, fading and so on, the signals are no longer correctly decoded on the receiver side. Still more, a loud impulse noise is produced if a binary signal having a charge of relatively large value in one sampling block is damaged by noise to modify the sign of the binary signal. In actual communication systems, noise of this kind occurs rather infrequently and discretely; nevertheless, it is highly desirable for such a noise to be completely absent from the final output of the receiver. Many techniques have conventionally been proposed with a view to suppressing noise caused by digital error.

The most general method for suppressing noise due to digital error comprises transmitting data signals with independent control signals for correction of digital error being intruded into the data signals and comparing on the receiver side the received data signals with the received control signals to detect and correct digital error, if any. Although this method enables detection and correction of digital error with high probability, it not only necessitates installation of at least two independent processing systems each on the transmitter and receiver but also entails inevitable use of two independent communication bands. This method therefore proves inconvenient in the respect that it will make it difficult to secure sufficient communication lines for the large increase in transmission volumes expected in the future.

Another noise-suppressing method which diminishes or eliminates undesirable effects of electrical disturbances when the carrier level is increased beyond the noise level as in the frequency modulation (FM) receiver has suffered from the disadvantage that spectral distortion occurs in the processed signals and degrades the quality of the signals.

SUMMARY OF THE INVENTION

An object of this invention is to provide a method and apparatus for suppressing noise in received signals owing to obstacles encountered in the propagation path and encoding received signals to reproduce the given information free from noise with high-fidelity on the receiver side.

To accomplish the object described above, the method of this invention for suppressing digital error noise in sampled signals serially received by a receiver comprises the steps of subjecting the sampled signals received to discrete Fourier transform thereby producing a frequency spectrum for the received signals, subtracting a predetermined flat spectrum component from the amplitude spectrum component of the frequency spectrum, subjecting the spectrum component remaining after the subtraction to inverse Fourier transform thereby detecting positions of occurrence of digital error noise, correcting the received signals by use of interpolation made between a set of several sampled signals before and after the detected signal containing the noise component, whereby the digital error noise in the received signals is suppressed to reproduce the information on the transmitter side with high-fidelity.

The apparatus of the present invention for the suppression of digital error noise comprises a Fourier transform processor for calculating the frequency spectrum, an inverse Fourier transform processor, and peripheral processing circuits serving the two processors. Adoption of the fast Fourier transform algorithm for both Fourier transform and inverse Fourier transform permits a considerable reduction in the time required for the calculations and materializes real-time processing for the suppression of noise.

Besides the aforementioned noise-suppression processing by use of the frequency spectrum of the received signals, two other processings may complementarily be provided to suppress digital-error noise more effectively and accurately; i.e., one noise-suppression processing in pause intervals (devoid of signals) by determining as a digital-error noise-any sampled signal rising above the predetermined threshold value and correcting the noise signal and the other noise-suppression processing by differential signal performed by detecting, in a relatively low-frequency band, any sampled signal as a digital error noise, which shows a conspicuous difference of amplitude from several adjoining sampled signals and effecting a necessary correction of the signal.

The other objects and characteristics of the present invention will become apparent from the further disclosure of the invention to be made hereinafter with reference to the accompanying drawing.

BRIEF EXPLANATION OF THE DRAWING

FIG. 1 is a schematic explanatory diagram of a transmitter-receiver system to which the method for the suppression of digital error noise according to the present invention is applied.

FIG. 2 is a flow chart illustrating the procedure of processing according to the method of this invention for the suppression of digital error noise.

FIG. 3 is a block diagram illustrating one preferred embodiment of the apparatus of this invention for the suppression of digital error noise.

FIG. 4 is a diagram illustrating typical signal wave forms obtained during a test processing of digital signals according to the method of this invention for the suppression of digital error noise.

FIG. 5 is a block diagram illustrating another preferred embodiment of the apparatus of this invention for the suppression of digital error noise.

DESCRIPTION OF THE PREFERRED EMBODIMENT

This invention relates to a method and apparatus for suppressing digital error noise occurring in the received signals in digital telecommunication, and more particularly for suppressing such noise on the receiver side without use of special control signals for error-detection other than the data signals being transmitted.

In FIG. 1, which schematically illustrates the apparatus of this invention for the suppression of digital error noise, the apparatus is shown in conjunction with a transmission-reception system which forms a general construction for digital communication.

Generally in digital communication, given data signals S(t) are subjected to sampling to produce corresponding sampled values in the transmitter 1, the individual sampled values are quantized with binary digits by an analog-digital converter and the resultant digital signals are transmitted on a carrier wave through the propagation path. On receiving the binary-coded signals R(t) from the transmitter, the conventional receiver regenerates and amplifies such signals in the demodulator (DEMOD) 3 and decodes the received signals in the decoder (DCD) 4. Then, the signals r(t) thus decoded in DCD 4 are converted into corresponding analog signals by the digital-analog converter (D/A) 5 and the analog signals are discharged in the form of audio-signals ($r_{out}$) through a low-pass filter (LPF) 6. Although the conventional digital transmission-reception system illustrated as a typical specimen here produces a high-quality output free from noise than other contertype systems, the binary-coded signals reaching the receiver, while being transmitted via the propagation path, encounter various disturbances, such as electric disturbances, and are consequently susceptible to digital error, with the result that the signals received by the receiver will inevitably contain discrete noise. If such a digital error happens to be produced on a large quantum component, it tends to have particularly conspicuous adverse effects as on audio output signals. To cope with this disadvantage, there has been adopted a method which comprises control signals 8 for detection and correction of digital errors independently with data signals 7 as shown in the diagram, causing the data signals arriving on the receiver side to be compared with the control signals to effect detection and correction of digital errors involved. Of course, a method which effectively suppresses digital errors without necessitating use of control signals will permit notable simplification of the transmitter-receiver and, therefore, prove highly advantageous for communications satellites, for example.

This invention has materialized a method and apparatus which permit digital error noise produced in the data signals while in transmission from the transmitter to the receiver to be suppressed with high accuracy on the receiver side based solely upon the data-transmitting signals without relying on special control signals or the like.

According to this invention, the digital error noise introduced into the data signals in transmission are very effectively suppressed on the receiver side without use of control signals and their attendant processing devices by causing a noise suppressing circuit 10 which will be fully described afterward to be incorporated into the telecommunication system, specifically between the decoder 4 and the D/A converter 5 in the receiver as illustrated in FIG. 1.

If the control signals 8 are not used in the aforesaid telecommunication system, then the decoded signals r(t) and consequently the audio output signals $r_{out}$ from the receiver will be accompanied by noise N due to digital errors at large. In view of this situation, the present invention subjects the decoded signals r(t) to a noise-suppression by use of the frequency spectrum of the received signals and, consequently, enables the receiver to deliver output signals $r_{out}$ free from the noise N, and corresponding exactly to the given data signals S(t). A flow chart which describes in outline a circuit 10 used for the aforesaid noise-suppression is given in FIG. 2.

The decoded signals r(t) which are inputted to the noise-suppression circuit 10 correspond to the binary-coded signals to be obtained by quantizing the data signals S(t) on the transmitter side. In other words, they are the signals equivalent to the signal trains obtained by subjecting data signals S(t) to high-speed sampling to produce sampled values as time-varying discrete values then expressing the individual instantaneous amplitudes of the sampled values in the form of binary digits. The input signal shown in FIG. 2 is a signal train $r(t_i)$ (wherein, i=1, 2, ... n) consisting of a plurality of blocks each of an arbitrary number (n) of sampled signals. The wave form of the input signals is illustrated with the time axis notably exaggerated to facilitate discernment. Each of the blocks of the signal train $r(t_i)$ is subjected to fast Fourier transform (FFT) 11 to produce the short-time frequency spectrum, $Ar(k)\cdot\exp[-j\phi_r(k)]$, (wherein, k=0, 1, 2, ... n−1). In the formula, Ar(k) stands for amplitude spectrum ($Ar^2(k)$ represents electric power spectrum), $\phi_r(k)$ for phase spectrum and j for $\sqrt{-1}$ (complex number). It is provided that the transmitted signal block corresponding to the received signal block is represented by $S(t_i)$ (wherein, i=1, 2, ... n) and the short-time frequency spectrum by $As(k)\cdot\exp(-j\phi_s(k))$. Assume, at this time, that a digital error noise N having an amplitude of the value of h occurs on the m'th signal $r(t_m)$ in the received signal block, and the following relationship will exist between the received signal train and the transmitted signal train.

$$r(t_m) = S(t_m) + h \quad (1)$$

The short-time frequency spectrum for the noise dimension containing the digital error noise is expressed by $$h \cdot \exp\left(-j \cdot \frac{2\pi mk}{n}\right).$$

In this formula, h stands for a flat amplitude spectrum ($h^2$ represents a flat power spectrum) and $-2\pi mk/n$ for a phase spectrum respectively. The frequency spectrum of both the signals expressed by the formula (1) given above is expressed as follows.

$$Ar(k) \cdot \exp(-j\phi_r(k)) = \quad (2)$$

$$As(k) \cdot \exp(-j\phi_s(k)) + h \cdot \exp\left(-j\frac{2\pi mk}{n}\right)$$

In this case, the following relationship holds true.

$$Ar(k) = \quad (3)$$

$$\left\{ As^2(k) + 2As(k) \cdot h \cdot \cos\left(\phi_s(k) - \frac{2\pi mk}{n}\right) + h^2 \right\}^{\frac{1}{2}}$$

$$\phi_r(k) = \tan^{-1}\left\{ \frac{As(k) \cdot \sin\phi_s(k) + h \cdot \sin\left(\frac{2\pi mk}{n}\right)}{As(k) \cdot \cos\phi_s(k) + h \cdot \cos\left(\frac{2\pi mk}{n}\right)} \right\} \quad (4)$$

It should be noted that the amplitude spectrum $Ar(k)$ includes the flat spectrum component $h^2$ expressive of the digital error noise.

Through the Fourier transform described above, the amplitude spectrum $Ar(k)$ of the received signal for a short span of time is extracted. In this spectrum, the digital error noise manifests itself in the form of an amplitude of a high value as shown by the corresponding waveform in the diagram.

By spectrum subtraction 12, the flat spectrum of the value Dh preset to the extend of the maximum quantization level of the signal being transmitted is subtracted from the amplitude spectrum $Ar(k)$ from the Fourier transform 11. This spectrum subtraction results in extraction of the amplitude spectrum $Ar'(k)$ in which the amplitude of the digital error noise has been notably attenuated. Where $Ar(k) - Dh < 0$, $Ar'(k) = 0$ is to be assumed.

By performing the inverse fast Fourier transform (IFFT) 13 upon the amplitude spectrum $Ar'(k)$ resulting from the aforementioned subtraction, there can be extracted the waveform $r'(t_i)$ in which the corresponding noise component has been appreciably attenuated as compared with the noise component in the input signal train $r(t_i)$.

The pure noise component $d(t_i)$ can be extracted by finding the difference between the input signal train $r(t_i)$ and the waveform component $r'(t_i)$ resulting from the spectrum subtraction. In the noise component waveform, the time point $t_m$ of the component N' having a particularly large amplitude is detected by the time-detection 14. Further by the determination arithmetic operation 15, the component $d(t_m)$ having the maximum value at the time $t_m$ is compared with the preset threshold value Dn to determine whether or not the component is a noise. When the component $d(t_m)$ is greater than the threshold value, the signal $r(t_m)$ at the time $t_m$ in the signals of the block is given a necessary correction by the correction treatment 16. When the component $d(t_m)$ is smaller than the threshold value Dn the signal train $r(t_i)$ is judged to contain no digital error noise and no correction is made.

By the correction 16 described above, the signal $r(t_m)$ regarded as a digital-error noise is eliminated by deriving, an an output, interpolation made with respect to the preceding and following sets each of several signal components interposed by the signal $r(t_m)$ instead of the noise signal. This is made possible by the fact that the data signals being transmitted, e.g. audio signals, vary with intimate correlationship between subsequent sampled signals in the instantaneous value thereof, and when one of the signals has an amplitude so large as to impair the correlationship due to a digital error noise occuring for an extremely short span of time, it can readily be corrected by using the interpolation made from the preceding and following sets of the signal.

As described above, based solely on the received signals which reach the receiver, the positions at which digital error noises occur are detected and the noise components are eliminated from the received signals to produce signals faithfully corresponding to the primary signals given to the transmitter.

FIG. 3 is a block diagram of one embodiment of the apparatus to be used for carrying out the noise-suppression by the frequency spectrum described above. Now, the operation of the apparatus will be described with reference to this diagram.

The sampled signal trains $r(t_i)$ decoded in the receiver is equivalent to a train of signals obtained as discrete values by subjecting the time-varying magnitude of the data signals inputted to the transmitter to high-speed sampling, and is first supplied as an input to the buffer memory 20, there to be adjusted so as to be easily controlled in the subsequent processors.

The input register 21 causes the signal train fed from the buffer memory 20 to be segmented into blocks for n-sampled signals and delivers these blocked signals one by one to the subsequent circuit. This register 21 is composed of a pair of memory units which are adapted so that while one of the memory units which has finished storing n-sampled signals is in the process of transferring them to the subsequent circuit, the other memory unit stores the following signal train. This operation alternates between the two memory units.

The signal train for one block from the register 21 is fed to the multiplier 22 in which the individual signals of the blocked signals are multiplied by the time-window constant $c_i$ (wherein, i=1, 2, ... n) preset in the memory 23 to enhance the operational accuracy of the subsequent processors.

The configurations and functions of the subsequent circuits correspond to the processing steps illustrated in FIG. 2. Specifically, each blocked signal $r(t_i)$ (wherein, i=1, 2, ... n) is converted by the fast Fourier transformer FFT 24 into the frequency spectrum represented by the formula (2), the amplitude spectrum $Ar(k)$ component of the frequency spectrum is fed to the subtractor 25, there to be subtracted by the flat spectrum value Dh to find the spectrum $Ar'(k)$ in which the noise component has been attenuated by the subtraction of the value Dh. In the inverse fast Fourier transformer IFFT 26, the phase spectrum $\phi_r(k)$ from FFT 24 and the amplitude spectrum $Ar'(k)$ from the subtractor 25 are synthesized to produce a signal train $r'(t_i)$ which is fed to the arithmetic unit 27. In this unit 27, a signal $d(t_i)$ in which the digital error noise alone has been amplified is obtained by finding the difference between the signal $r(t_i)$ from the multiplier 22 and the signal $r'(t_i)$ from IFFT. When the waveform of the signal contains an impulsive, conspicuously large amplitude, the time $t_m$ of the portion of that amplitude is detected by the detector 28. The value $d(t_m)$ showing the large amplitude is compared with the threshold value Dn in the comparator 29. When $d(t_m)$ is greater than Dn, the corrector 30 is given an instruction to the effect that the noise component at the time $t_m$ in the signal train should be corrected by using interpolation with reference to amplitude values of the several preceding and following sets of the sampled signals. If $d(t_m)>D_n$, an instruction is given that the signal $r(t_i)$ given as an input should be delivered via the output register 31 and the buffer memory 32. In this way, the noise due to digital error is completely removed from the received signal. Thus, a received signal containing no noise is forwarded over the shortest route from the input register 21 to the output register 31, thereby to prevent the received data signals from suffering any deterioration in quality.

The individual processors constitutive of the apparatus described above are all widely used in electronic devices in general and have the functions fully known to the art. The crux of this invention resides in the method of processing which is illustrated in the flow chart of FIG. 2. Insofar as the processing is throughly accomplished, the circuit may be in any configuration conceivable at all. The structure of FIG. 3 is shown purely for the purpose of illustration and is not meant for limitation in any sense.

The waveform diagram of FIG. 4 represents a typical test result obtained in accordance with the method of this invention for noise suppression. The uppermost waveform S(t) in the drawing is the voice signal of the vowel /a/ pronounced by a male person and inputted to the transmitter. The waveform r(t) is the signal received by the receiver, and it is found to contain a digital error noise N which was not present in the original signal on the transmitter side. When the aforementioned noise-suppression is performed on this signal r(t), there is obtained a waveform $d(t_i)$ in which the digital error noise alone is amplified, and the portion L of the waveform having the amplified amplitude is detected as the position of the noise. The output signal $r_{out}$ which has undergone noise-suppression has the lowermost waveform illustrated. A close examination of this waveform reveals that it is substantially identical to the waveform of the original signal S(t) given to the transmitter, indicating that the processing has suppressed the digital error noise and consequently produced an output signal with high-fidelity.

The second embodiment is aimed at further enhancing the reliability of the noise suppression and accomplishing the reception of signals of high-quality, and it is represented in a schematic block diagram in FIG. 5. In this embodiment, the circuit 10 in the last state is a circuit for noise suppression by use of the frequency spectrum described so far.

The noise-suppression circuit 40 in the first stage serves to suppress noises which discretely occur in the pause (absence of signal reception) intervals. Generally, while such discrete digital error noises occur in the form of impulses of extremely short spans of time, voice signals change very slowly along the course of time. When such a noise occurs in a pause interval, therefore, it can be easily detected.

Similarly in this embodiment, the signals received by the receiver are sampled at short intervals of time and the individual sampled signals are compared with the preset threshold value Dp (desirably the minimum quantization level in the PCM communication). When a series of sampled signals possess values smaller than the threshold value Dp arriving over a relatively large span of time, they can be judged to form a pause interval P. When an amplitude $N_1$ greater than the threshold value Dp occurs in a pause interval, the preceding and following sets each of several (generally two to six) sampled values interposed by that amplitude are compared with the threshold value. When the amplitude value is smaller than the threshold value, then the amplitude $N_1$ can be judged to represent a digital error noise. The noise in a pause interval can be eliminated, therefore, by suppressing the amplitude $N_1$ below the threshold level Dp and, as a result, there will be no unpleasant clicking noise.

The second step serves to suppress the type of digital error noise which occurs in the relatively low-frequency band as in voice signals received by the receiver and, for this purpose, involves use of a noise-suppression circuit 50 effected by use of a differential signal. Generally, the waveform of voice signals is such that, as already described, the finely divided sampled signals, from the individual level point of view, shows an intimately interrelated, smooth gradient characteristic. When the successive sampled signals are compared with one another and this comparison reveals the presence of sampled signal of a quantum value so large as to upset the intimate inerrelationship, this particular sampled signal is judged to represent a digital error noise $N_2$. Then, interpolation is effected with respect to the preceding and following sets each of several sampled signals between which that particular sampled signal is interposed and the resultant value of interpolation is substituted for the noise signal and delivered as the output.

The last step utilizes the noise-suppression circuit 10 by use of the frequency spectrum illustrated in FIGS. 1–3. Since this circuit has a configuration such as to suit high-speed processing, it advantageously serves, in particular, the purpose of suppressing the noise $N_3$ occurring in the high-frequency band of the signals received by the receiver.

Because the digital-error noise in the pause intervals and that in the low-frequency bands of smooth waveforms are suppressed in advance, the processing for the suppression of the remaining digital error noise by use of the frequency spectrum can be carried out with improved efficiency and enhanced reliability.

Now, the results of the trial application to PCM communication of the method of the present invention for the noise suppression by use of frequency spectrum will be described below.

In this test, short sentences uttered in male and female voices for varying periods of from four to eight seconds were used as sources of voice signals. First, the voice signals were limited within the fixed frequency range of from 200 Hz to 4,000 Hz and were sampled at a sampling period of 8 KHz. The signals were compressed with 15-segment companding characteristics of $\mu=255$ and coded in the binary notation into eight-bit signals including a polarity bit. In the train of binary signals obtained as described above, digital errors were randomly introduced by using random numbers.

The train of binary signals were decoded, and the method of this invention was applied to the train of signals expanded by the aforementioned companding characteristic. As the result of the processing by this method, voice signals of a quality level involving digital error noise on the order of digital error ratio of $10^{-4}$ could be improved to a quality level involving digital error noise of the order of digital error ratio of $10^{-6}$ or less.

In the embodiments so far described, the amplitude spectrum resulting from the Fourier transform of signals has been used for arithmetic operations. Since the power spectrum is the square of the corresponding amplitude spectrum, the arithmetic operations performed by using the power spectrum in place of the amplitude spectrum yield the same results.

When the method of the present invention for the suppression of noise is applied to PCM communication as described above, only the signals containing digital error noise are selectively corrected and those free from noise disturbances are left intact and, consequently, no spectral distortion or the like is imparted to the final signals. The method of this invention, as such, can be utilized for the suppression of digital error noise not only in PCM communication and other high-fidelity digital telecommunication such as a voice communication using control signals for error-correction but also in ordinary data telecommunication and PCM recording.

When two or three systems according to this invention are arranged in serial connection, the suppression of digital error noise can be accomplished with increased efficiency.

What is claimed is:

1. A method for the suppression of digital error noise in received sampled signals in digital telecommunication, which method comprises the steps of:

subjecting said received sampled signals to Fourier transform to extract a frequency spectrum composed of an amplitude spectrum and a phase spectrum;

subtracting from said amplitude spectrum a flat spectrum determined by the maximum level of said sampled signals to obtain a subtracted amplitude spectrum;

synthesizing said subtracted amplitude spectrum and said phase spectrum to produce spectrum-subtracted signals;

extracting the difference between each of said sampled signals and each of said spectrum-subtracted signals to obtain a differential signal waveform;

detecting a particular signal having a conspicuously large amplitude occuring in said differential signal waveform;

comparing said large amplitude with a fixed threshold value; and correcting the particular signal of said large amplitude, when the amplitude is greater than said threshold value, by use of interpolation with respect to the preceding and following sets each of several sampled signals between which said particular signal having the large amplitude is interposed.

2. The method according to claim 1, wherein the received signals are stored as output signals when the conspicuously large amplitude in said differential signal waveform is smaller than said fixed threshold value.

3. The method according to claim 1, wherein the arithmetic operations are performed by using the power spectrum which is obtained by squaring the amplitude spectrum component of the frequency spectrum resulting from said Fourier transform.

4. An apparatus for the suppression of digital error noise in received sampled signals in digital communication, which comprises:

a Fourier transformer for subjecting the received sampled signals to Fourier transform to produce a frequency spectrum composed of an amplitude spectrum and a phase spectrum;

a subtractor for subtracting a flat spectrum from the amplitude spectrum fed from said Fourier transformer to produce a subtracted amplitude spectrum;

an inverse Fourier transformer for subjecting the subtracted amplitude spectrum fed from said subtractor and said phase spectrum fed from said Fourier transformer to produce inverse Fourier transform thereby producing subtracted signals; and a circuit for detecting a particular signal having a conspicuously large amplitude in the subtracted sampled signals fed from the inverse Fourier transformer and correcting said particular signal when it is greater than a fixed threshold value by interpolation with respect to the preceding and following sets each of several sampled signals between which the particular signal having the large amplitude is interposed.

5. An apparatus for the suppression of digital error noise in received sampled signals in digital telecommunication, which apparatus comprises:

an input register for storing received sampled signals;

a multiplier for multiplying each of the sampled signals from said input register by a time-window constant;

a Fourier transformer for subjecting said sampled signals fed from said multiplier to Fourier transform to extract a frequency spectrum composed of an amplitude spectrum and a phase spectrum;

a subtractor for subtracting a flat spectrum determined by the maximum level of said sampled signals from said amplitude spectrum extracted by said Fourier transformer to obtain a subtracted amplitude spectrum;

an inverse Fourier transformer for synthesizing the subtracted amplitude spectrum from said subtractor and said phase spectrum from said Fourier transformer to obtain spectrum-subtracted signals;

an arithmetic unit for extracting the difference between each sampled signal from said multiplier and each spectrum-subtracted signal from said inverse Fourier transformer to produce a differential signal waveform;

a detector for detecting a particular signal having a conspicuously large amplitude occurring in said differential waveform from said multiplier;

a comparator for comparing the large amplitude fed from said detector with a fixed threshold value and issuing an instruction to correct said particular signal containing a digital error noise when it is greater than said threshold value;

a corrector for effecting correction of said particular signal, upon reception of an instruction signal from said comparator, by subjecting the particular signal of said conspicuously large amplitude to interpolation with respect to the preceding and following sets each of several sampled signals between which said particular signal is interposed; and an output register which serves to store and deliver the signals from said corrector when the instruction signal to correct said particular signal is issued from said comparator, and which serves to store and deliver the received sampled signals from said input register when said instruction signal is not issued from said comparator.

6. The apparatus according to claim 5, further comprising a circuit which effects the suppression of digital error noise in pause intervals by comparing the received signals in amplitude with a threshold value determined by the minimum quantization level for said received sample signals, and suppressing a sampled signal in the received signals possessing an amplitude larger than the threshold value to a level below the value, whereby sampled signals free from digital error noise in the pause intervals are applied to said input register.

7. The apparatus according to claim 5, further comprising a circuit which effects the suppression of digital error noise generated in a relatively low-frequency band by comparing the amplitude of successive sampled signals with those of several sampled signals preceding and following said successive sampled signals, suppressing a particular sampled signal showing an amplitude of conspicuously large value in comparison with the preceding and following sampled signals by interpolation with respect to the preceding and following sets each of several signal components between which the particular sampled signal is interposed, whereby sampled signals free from digital error noise in the low-frequency band are applied to said input register.

8. The apparatus according to claim 6, further comprising a circuit which effects the suppression of digital error noise generated in a relatively low-frequency band by comparing the amplitude of successive sampled signals with those of several sampled signals preceding and following said successive sampled signals, suppressing a particular sampled signal having a conspicuously large amplitude in comparison with the preceding and following sampled signals by interpolation with respect to the preceding and following sets each of several signal components between which the particular signal is interposed, whereby sampled signals free from digital error noise in the low-frequency band are applied to said input register.

* * * * *